No. 640,196.  
C. D. HASKINS.  
ELECTRIC METER DEVICE.  
(Application filed Oct. 26, 1898.)  
Patented Jan. 2, 1900.
(No Model.)
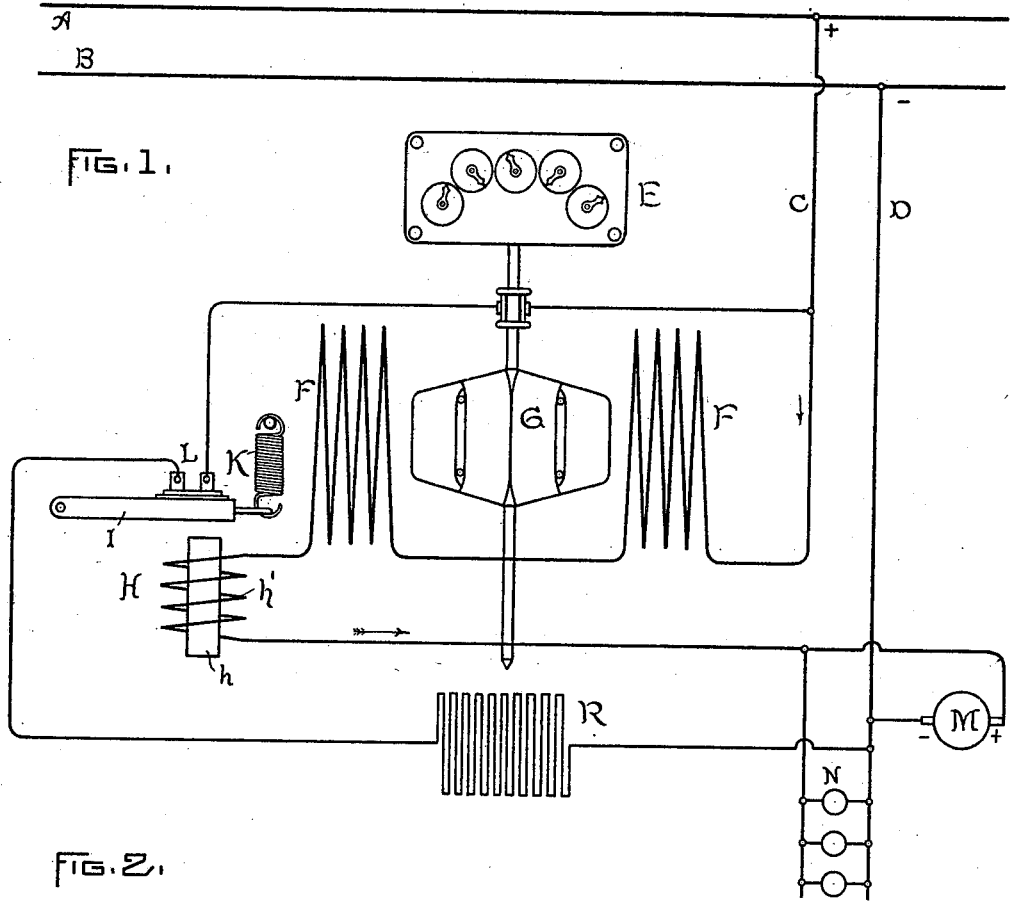
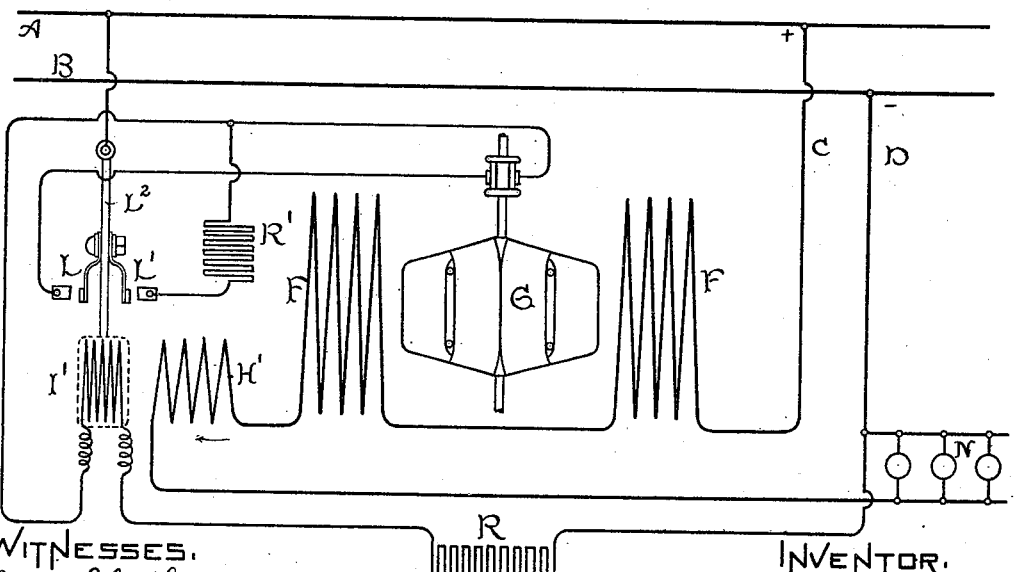
WITNESSES.  
A. H. Abell.  
A. F. Macdonald.
INVENTOR.  
Caryl D. Haskins,  
by Albert G. Davis,  
Atty.

UNITED STATES PATENT OFFICE.

CARYL D. HASKINS, OF NEWTON, MASSACHUSETTS, ASSIGNOR TO THE GENERAL ELECTRIC COMPANY, OF NEW YORK.

ELECTRIC-METER DEVICE.

SPECIFICATION forming part of Letters Patent No. 640,196, dated January 2, 1900.

Application filed October 26, 1898. Serial No. 694,645. (No model.)

*To all whom it may concern:*

Be it known that I, CARYL D. HASKINS, a citizen of the United States, residing at Newton, county of Middlesex, and State of Massachusetts, have invented certain new and useful Improvements in Electric-Meter Devices, (Case No. 715,) of which the following is a specification.

My present invention relates to electric meters, and has for its object to prevent a misuse of such meters, which sometimes occurs. In the operation of isolated plants it often happens that the maximum load is greater than the plant can conveniently carry. In this case it is customary to call on the usual central-station supply of the city or district for the excess, installing an electric meter, which registers the amount of current taken from the city-mains. This arrangement, however, permits the ready cancellation of the meter charge by running the isolated plant at a little higher potential during the times of minimum or no load, so as to return current from the isolated plant to the main, which may be carried to such an extent as to entirely cancel the meter registration. The effect of this is to borrow energy from the central station at the time of maximum demand and to return it at the time of minimum demand, a practice obviously highly disadvantageous to the central station, since it takes current at the very time when the generators are overloaded and returns it at a time when the load is small. It is therefore desirable to have some means of preventing the meter from turning backward under any circumstances. Mechanical appliances have been proposed for this purpose; but they are undesirable for many reasons. My invention contemplates opening the armature-circuit as a means of preventing the meter registration at such times as may be desired, for which a number of methods may be employed. For continuous currents I have preferred to use a polarized circuit-controller. During the normal operation of the meter the controlling device, which should be included in series with the field-coils, holds the armature-circuit closed, a spring assisting in this action. If the current in the field is reversed, the circuit-controller opens the armature-circuit of the meter. As a variation of this device having substantially the same function I may with alternating currents use two coils—one in the armature-circuit and one in the field-circuit—so wound and connected as to utilize the mutual action of alternating currents when flowing in one direction to hold the armature-circuit closed and in the other to open it, as occasion may require. As a substitute for the spring in this latter case I may keep the circuit of one of the coils closed through a resistance, so that it is always prepared to act, as will be more fully described hereinafter. Ordinarily, however, the spring will be all that is necessary.

The accompanying drawings show in diagram a meter connected according to my invention.

Figure 1 is a device adapted for continuous current, and Fig. 2 a modification for alternating currents.

A B are the mains, C D being the branch containing the lights N.

M is the generator of the isolated plant, taken as typical of any installation where energy may be either consumed or supplied.

E is the counter or register of the meter.

F F are the field-coils, and G is the armature.

R is the usual calibrating resistance in the armature-circuit, which, as will be seen, is in a shunt-circuit across the mains, starting from the lead C, passing through the armature, across the contacts L, and through the resistance to the lead D. The field-coils are of course in series with the load.

In series with the fields F is the electromagnet H, consisting of the core $h$ and the coil $h'$. The armature I is polarized and closes the contacts L under normal conditions of working—that is, when the current flows from the mains. A spring K assists the armature. Ordinarily the contacts L are closed, and the meter is ready to register whenever current flows to the load from the mains A B, the armature I being repelled by the electromagnet H. If the current reverses in the meter, the armature I will be attracted by the magnet and will open the contacts against the force of the spring K. When current ceases to flow in the wrong direction, the spring will again close the contacts and the meter will be in readiness to operate when energy is taken from the mains.

The form of the invention shown in Fig. 2 is particularly adapted to alternating currents, though its use is not restricted thereto. In this form the connections are as before, except that for the polarized device H is substituted the coil H', which need not have a core, and a coil I', connected in series with the armature. The coils are so wound and connected that the flow of current from the mains A B through the coil H' acts to repel the coil I', which is carried on the lever L², this action closing the contact L, so that the armature G is included in the circuit. When the current reverses, the coil I' is attracted and opens the contact L, thus opening the armature-circuit. If desired, the contact L' may also be added, and in this case a spring for the lever L² will not be necessary. Here the resistance R' (which may be quite large in amount) is included in the circuit by the contact L', the armature remaining cut out. In this case the current flow in the coil I' will be maintained, so that when the current again reverses in the coil H'—that is, when energy is again taken from the mains A B—the coil I' will be ready to act and will close the circuit of the armature G.

It is manifest that other arrangements might be made which will accomplish the object of the invention; but any automatic device by which upon the reversal of current flow in the meter a circuit of the meter is so modified that the meter cannot be run backward I consider within my invention.

What I claim as new, and desire to secure by Letters Patent of the United States, is—

1. The combination, with an electric meter, of a device for opening a circuit of the meter, responsive to reversal of current operating the electric meter.

2. The combination with the mains of a distributing system, of a consumption-circuit fed therefrom but capable of returning energy thereto, and means whereby such return of energy causes a meter-circuit to be so modified as to prevent the registry of the returned energy.

3. In an electric meter, armature and field circuits, and a device for opening the armature-circuit when the current in the field reverses.

4. In an electric meter, the combination of armature and field circuits, with a circuit-controller in series with the fields and controlling the armature-circuit.

5. In an electric meter, a coil in series with the fields, a second coil in series with the armature, and contacts for opening and closing the armature-circuit controlled by the coils.

6. In an alternating-current electric meter, a coil in series with the fields, a second coil mounted for movement relative to the first, and contacts for opening and closing the armature-circuit, actuated by the movement of the coil.

7. In an alternating-current electric meter, the combination of a coil in series with the load, a second coil mounted for movement relative to the first and in shunt to the load, contacts actuated by the movement of the second coil, and circuits leading from the contacts, one including the motor-armature, the other a resistance.

8. The combination with an electric meter, of a coil in series with the field, and a second coil in series with the armature and in inductive relation to the first coil, and contacts controlled by said coils adapted to cut out the meter-armature upon a reversal of current in the field, without interfering with the flow of current in either of the said coils.

In witness whereof I have hereunto set my hand this 22d day of October, 1898.

CARYL D. HASKINS.

Witnesses:
HAROLD SHREVE,
DAVID L. BOWERS.